United States Patent Office 3,425,322
Patented Feb. 4, 1969

3,425,322
HYDRAULIC SLIDE CONTROL
Mosè Zucchellini, Turin, Italy, assignor to Fiat Società per Azioni, Turin, Italy
Filed Sept. 12, 1966, Ser. No. 578,659
Claims priority, application Italy, Sept. 17, 1965, 21,038/65
U.S. Cl. 92—27          3 Claims
Int. Cl. F15b *15/26;* F01b *15/02, 31/00*

ABSTRACT OF THE DISCLOSURE

A hydraulic slide control for a machine slide carrying a spindle to be moved axially relative to a stationary machine part includes a pair of hydraulically interconnected double acting cylinders positioned between the slide and stationary machine part symmetrically and parallel to the axis of movement of the slide. Auxiliary cylinders with spring biased pistons are positioned on the slide to normally brake and hold the slide with respect to the stationary machine part, but upon application of hydraulic pressure simultaneously to all cylinders the braking force of the auxiliary cylinders is released.

---

The invention relates to a hydraulic arrangement for effecting translation of a movable slide, more particularly a slide of a machine tool, incorporating an operating spindle or like member which is to be moved axially.

In such machines slide control is generally by means of a fluid pressure cylinder acting on the slide and exerting thereon a thrust parallel to the rotational axis of the spindle. This arrangement, however, results in a degree of torque which creates stresses in directions other than along the spindle axis. As is known, such stresses may give rise to various undesirable consequences during operation of the machine tool, such as uneven wear of the slide guideways, anomalies in feed and the like.

It is an object of the present invention to obviate these undesirable consequences by providing a hydraulic arrangement for effecting the translation of a slide, which arrangement does not create stresses in directions other than along the spindle or like member axis. In this way the slide motion may be rendered smoother and more accurate.

According to a further object the invention consists in a hydraulic arrangement for effecting translational movement of a machine slide carrying a member to be moved axially, wherein two double-acting hydraulic cylinders are formed in the slide body symmetrically one on each side of the said member, the said cylinders each cooperating with one of two pistons, the rods of which are fast with a stationary part of the machine, the said double-acting cylinders being fed in parallel to effect translation in either direction of the said slide and the member carried thereon.

By the term "double-acting" as used herein it is intended to mean a hydraulic arrangement which is arranged to exert pressure in either of its two axial directions without spring biasing.

These and other objects and advantages of the invention will be clear from the following description, given with reference to the accompanying drawings which are by way of example and in which.

Figure 4:
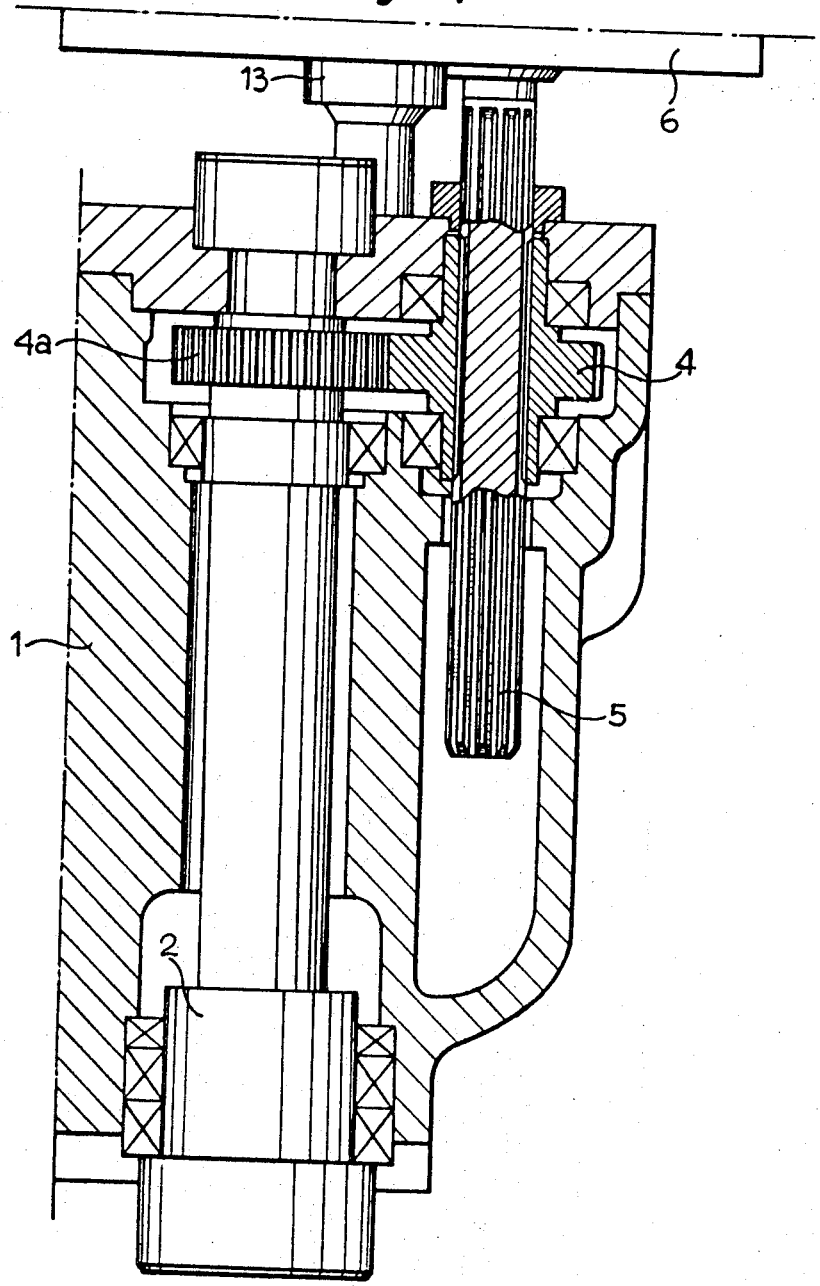
FIGURE 4 is an axial sectional view of the arrangement taken along line IV—IV of FIG. 1.

As shown in the figures, the body 1 of a spindle-carrying slide has formed therein a recess which accommodates a rotary spindle 2. The spindle 2 is provided at one end with a tool-carrying jaw 3 which is connected by a link 7 to actuating means. As is shown in FIGURE 4 the spindle 2 has keyed to one of its ends a toothed wheel 4a which cooperates with a toothed wheel 4 slidingly mounted on a splined shaft 5. The shaft 5 is arranged parallel to the spindle axis and is connected with spindle actuating means which are arranged within a support 6 fixed to the machine.

With this arrangement, rotation can be transmitted to the spindle during axial movement of the slide 1.

Figure 1:
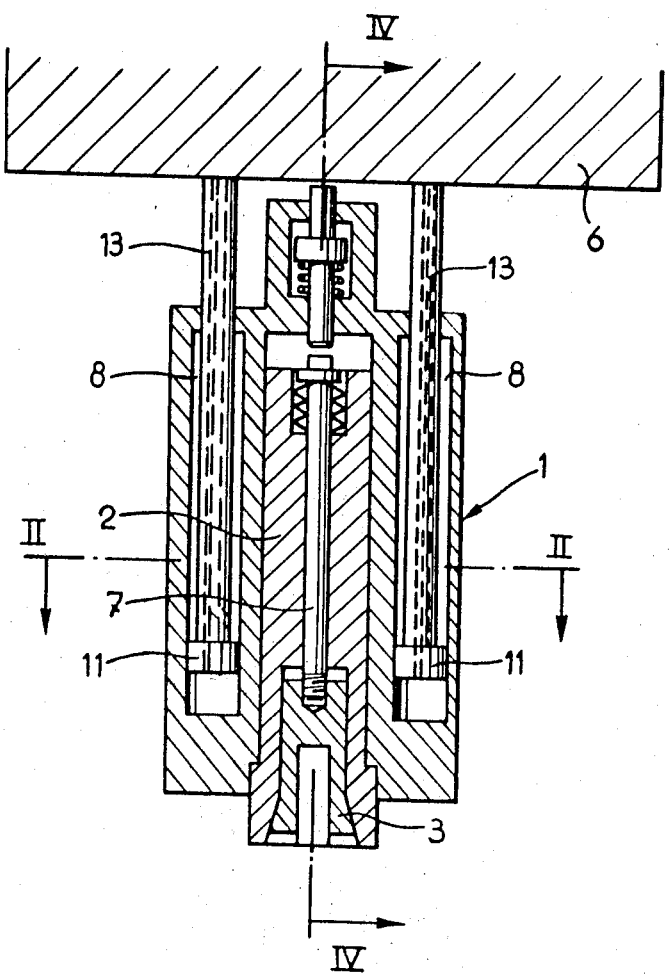
FIGURE 1 is an axial sectional view of a spindle-carrying slide incorporating an arrangement for effecting slide translation according to the invention.
Figure 2:
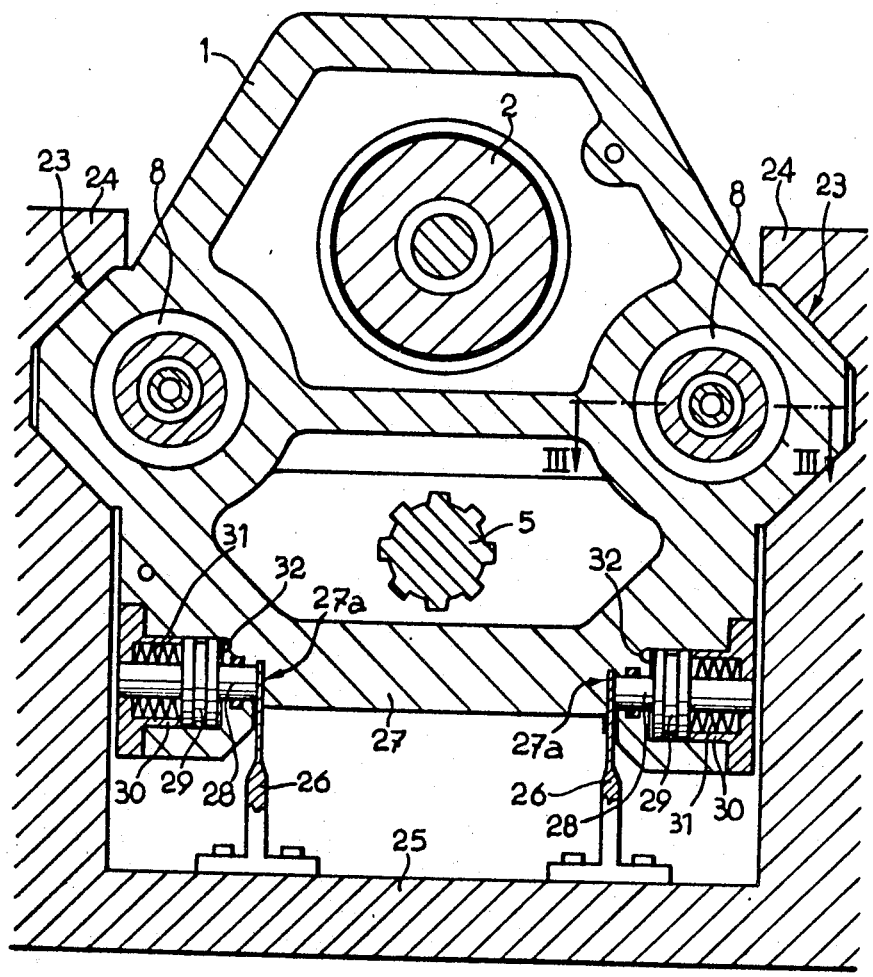
FIGURE 2 is a cross-sectional view, on an enlarged scale, taken along the line II—II of FIG. 1.

According to the invention two cylindrical recesses 8 are formed in the body of the slide 1 (see FIGS. 1, 2 and 3), these recesses being disposed symmetrically one on each side of the spindle 2. The said recesses 8 are utilised as double-acting fluid pressure cylinders for effecting translational movement of the slide in either direction.

Figure 3:
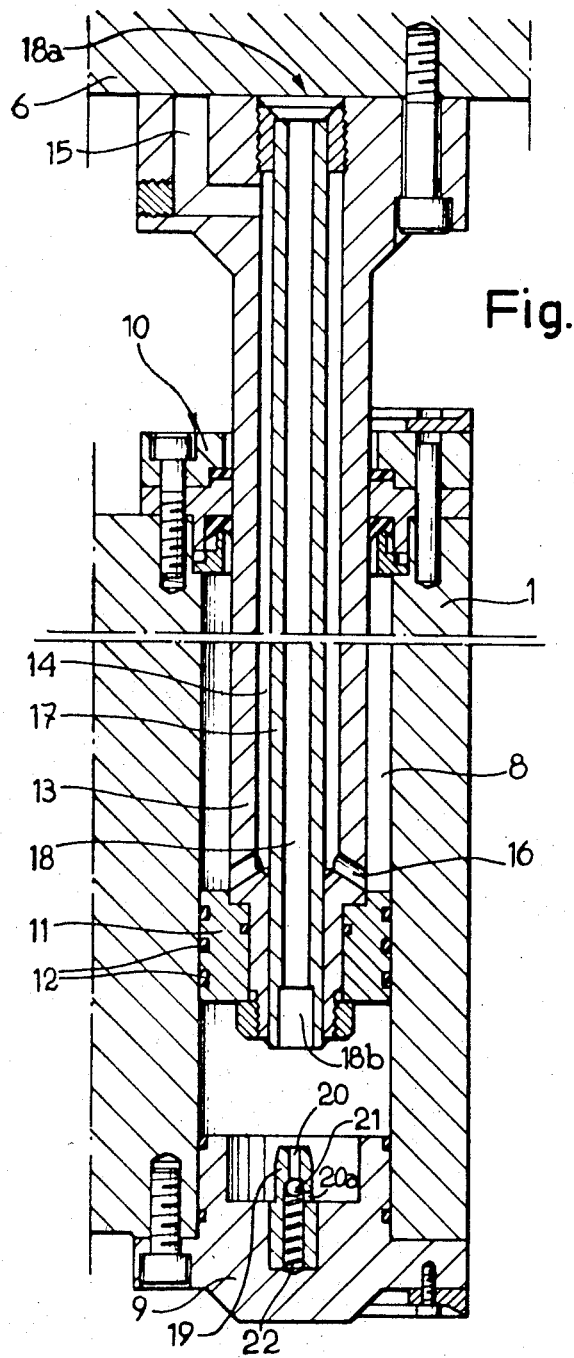
FIGURE 3 is an axial sectional view of one of the main cylinders taken along line III—III of FIG. 2.

Each said cylinder, as shown in FIG. 3, is closed at one end by a sealing head portion 9 and at its other end by a similar sealing head portion 10. As shown, the head portion 10 constitutes the top head portion. A piston 11 operates within each cylinder 8, each piston 11 being provided with seals 12 and being fast with a rod 13, the free end of which rod extends beyond the top head portion 10 of the cylinder and is secured to a stationary support 6 of the machine.

The piston rods 13 are each utilised as a flow line for the pressure fluid, for instance oil, for the two chambers in the cylinder. For this purpose the said rod 13 is formed with an axial bore coaxially accommodating a hollow rod 17. Between the rod 17 and the bore wall there exists an annular clearance 14 and this clearance is connected at the top end of the rod with a pressure fluid feed (or discharge) conduit 15. At the other end of the rod, near the piston, the said clearance 14 connects with a plurality of radial holes 16 which open into the upper chamber of the cylinder 8.

The axial bore 18 in the inner rod 17 connects at one end 18a with the pressure fluid feed (or discharge) conduit and opens at its other end 18b to the bottom face of the piston 11 in the lower chamber of the cylinder 8.

The cylinder head portion 9, which lies adjacent the free end of the piston, has secured thereto a throttle valve which comprises a projection 19 adapted to enter the terminal opening 18b in the piston rod when the piston approaches the head portion. The projection 19 is axially bored at 20, its bore connecting through side holes 20a with the inside of the lower chamber of the cylinder 8. Intercommunication of the holes is, however, normally intercepted by a ball-shaped valve member 21 which is biased by a spring 22. The valve arrangement is adapted to slow the piston over the end section of its stroke and so avoid shocks on abutment at the stroke limit.

It will by now be evident from the above description that the symmetrical arrangement of the two cylinders with respect to the spindle 2, which latter occupies the middle portion of the slide 1, will avoid the creation of thrust in directions other than along the spindle axis.

As an additional feature, the side 1 is laterally provided with shaped guides 23 (FIG. 2) which cooperate with stationary members 24 fixed to a machine bedplate 25. The said bedplate is formed at its lower region (as viewed in (FIG. 2) with two parallel ledges 26 which are adapted to slide during the translational movement of the slide, each in one of two clearances formed between the two juxtaposed ends 27a of a head carried by the slide and two sets of push members 28. The latter members are carried by pistons 29 which are biased by springs 31 within two sets of auxiliary hydraulic cylinders 30 symmetrically arranged on each side of the slide. The said auxiliary cylinders are fed with pressure fluid through conduits 32 which are connected in parallel with the feed of the two main cylinders 8.

When the slide is operated, the fluid pressure is transmitted not only to the main cylinders 8 but also to the auxiliary cylinders 30 whereby the push members 28 are moved against the action of the springs 31, away from the ledges 26.

When the slide is stationary and when there is no fluid pressure, the action of the springs 31 prevails and the pistons 29 are urged towards the ledges 26 so that the latter are each clamped between an end 27a of the slide bead 27 and a push member 28 fast with a said piston. In this way undesired axial displacement of the slide is prevented.

Various modifications of the invention are of course possible within the scope of the appended claims.

I claim:
1. A hydraulic arrangement for effecting translational movement of a machine slide with respect to a stationary part of a machine, the slide carrying a member to be moved axially with respect to the stationary part of the machine, the arrangement comprising: a hydraulic pressure fluid supply means, two pistons, two piston rods fast with the pistons and with the stationary part of the machine, two double acting hydraulic cylinders formed in the slide symmetrically with respect to the member carried by the slide, the cylinders each cooperating with one of the two pistons, the hydraulic pressure fluid supply means being interconnected with the cylinders to supply hydraulic pressure fluid simultaneously to both cylinders to effect translation in either direction of the slide and the member carried thereby, auxiliary hydraulic cylinders formed in the slide, the auxiliary cylinders also being simultaneously supplied with hydraulic pressure fluid from the hydraulic pressure fluid supply means with the double acting hydraulic cylinders, spring biased pistons mounted in the auxiliary cylinders and cooperating with the stationary part of the machine to prevent motion of the silde in the absence of hydraulic fluid under pressure.

2. A hydraulic arrangement as in claim 1 wherein the auxiliary cylinders are positioned to extend transversely of the slide axis and are arranged in symmetrical sets.

3. A hydraulic arrangement as in claim 2 wherein push members are provided, the push members being engaged by the spring biased pistons of the auxiliary cylinders, and the portion of the stationary part of the machine includes ledges attached to the machine stationary part, the push members frictionally contacting one side of the ledges and parts of the slide contacting the opposite sides of the ledges to brake and hold the slide with respect to the stationary machine part in the absence of hydraulic fluid under pressure.

References Cited

UNITED STATES PATENTS

| 1,843,082 | 1/1932 | Ferris et al. | 77—33.5 X |
| 2,001,716 | 5/1935 | Gartin | 92—117 |
| 2,111,033 | 3/1938 | Osgood | 92—146 X |
| 2,444,474 | 7/1948 | Somes et al. | 92—117 |
| 2,461,877 | 2/1949 | Brereton | 92—61 X |
| 2,494,013 | 1/1950 | Tapp | 92—66 X |
| 2,550,148 | 4/1951 | Harding | 92—146 X |
| 3,039,329 | 6/1962 | Gajda | 77—33.5 |
| 3,106,110 | 10/1963 | Senn | 77—63 X |
| 3,161,400 | 12/1964 | Floyd | 92—24 X |
| 3,177,779 | 4/1965 | Dobrikin et al. | 92—27 X |

FOREIGN PATENTS 911,508   11/1962   Great Britain.

MARTIN P. SCHWADRON, *Primary Examiner.*

I. C. COHEN, *Assistant Examiner.*

U.S. Cl. X.R.

77—33.5; 92—111, 85, 117, 146